No. 772,844. Patented October 18, 1904.

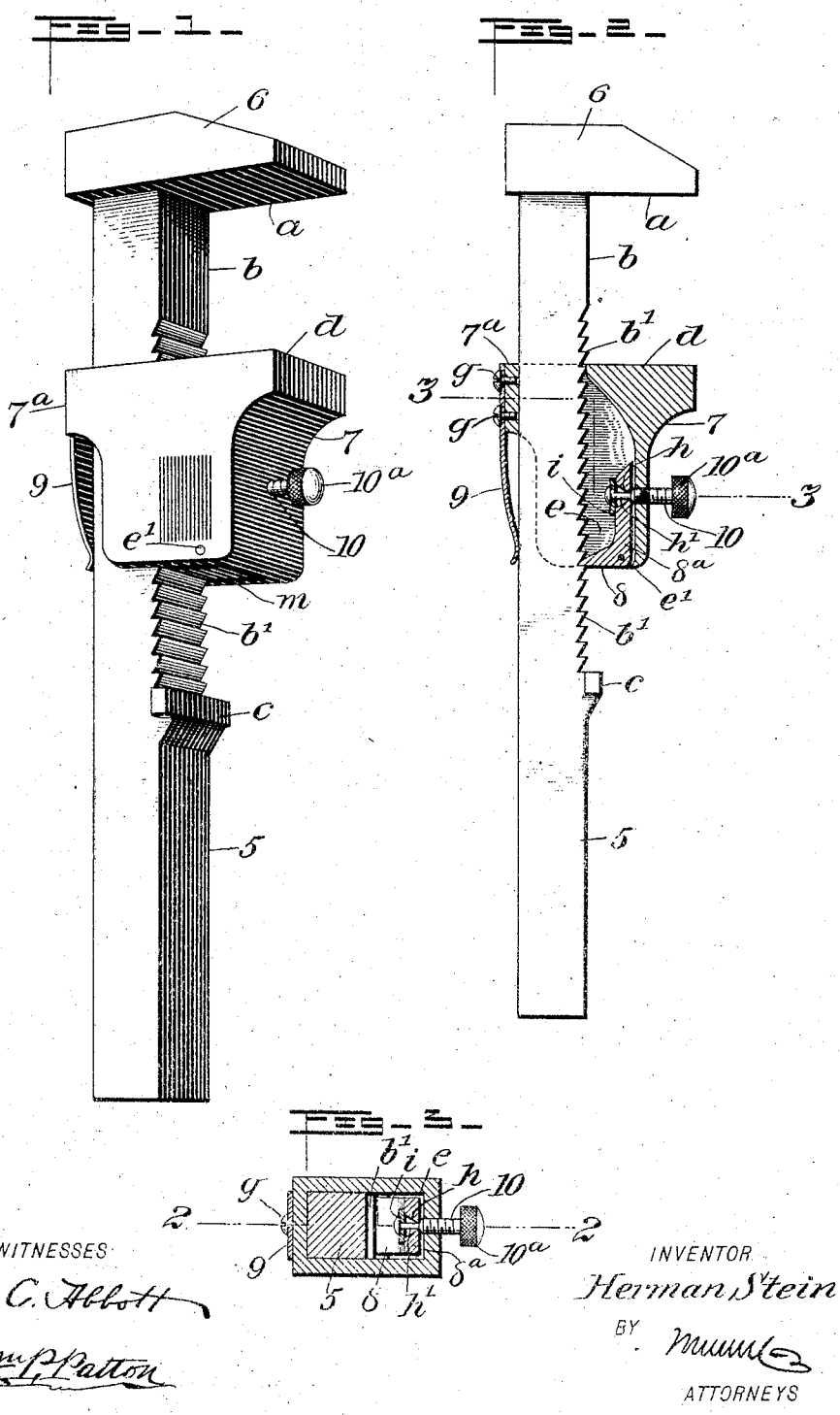

UNITED STATES PATENT OFFICE.

HERMAN STEIN, OF GEORGETOWN, MINNESOTA.

WRENCH.

SPECIFICATION forming part of Letters Patent No. 772,844, dated October 18, 1904.

Application filed February 5, 1904. Serial No. 192,117. (No model.)

*To all whom it may concern:*

Be it known that I, HERMAN STEIN, a citizen of the United States, and a resident of Georgetown, in the county of Clay and State of Minnesota, have invented a new and Improved Wrench, of which the following is a full, clear, and exact description.

This invention relates to a class of lever-wrenches having a fixed jaw, a slidable jaw, and means for holding the slidable jaw at a desired distance from the fixed jaw, and has for its object to provide novel details of construction for a wrench of the class indicated which adapt the wrench for a very convenient adjustment of the slidable jaw and enable the instant fixture of the movable jaw at a desired point on the lever-bar of the wrench.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a perspective view of the improved wrench. Fig. 2 is a partly-sectional side view of the same, showing interior parts, the section being substantially on the line 2 2 in Fig. 3; and Fig. 3 is a transverse sectional view substantially on the line 3 3 in Fig. 2.

The wrench-lever 5 is rectangular in cross-section and is provided with a fixed jaw 6 at one end that, as usual, is formed with a gripping-face $a$ at a right angle to the adjacent side $b$ of the lever. A series of ratchet-teeth $b'$ is formed in the side of the lever 5, said teeth hooking toward the fixed jaw 6, and at the end of the series of ratchet-teeth farthest from the fixed jaw an abutment-flange $c$ is formed.

A jaw 7, having a gripping-surface $d$ thereon, is mounted upon the wrench-lever 5, and, as clearly shown in Fig. 2, this jaw is formed with a recess $e$, that extends throughout the length of said jaw 7. The recess $e$ is rectangular in cross-section and is mainly open at the side which is farthest from the jaw-face $d$, a cross-bar $7^a$ being formed opposite said jaw-face, affording a four-walled opening that loosely receives the lever 5. It will be seen in Figs. 2 and 3 that the recess $e$ is of considerable transverse dimension, thus affording a suitable space between the bottom of the recess and the ratchet-teeth $b'$ when the loose jaw 7 is mounted upon the wrench-lever 5. A latch-dog is introduced in the space or unoccupied portion of the recess $e$, and, as shown in Fig. 2, this dog is substantially L-shaped, having two members 8 $8^a$, that are disposed at a right angle to each other on their outer surface. The limb or dog member 8 is of less length than the other member, $8^a$, and when in place the exterior surface of the limb $8^a$ normally has loose contact with the bottom wall of the recess $e$. When the dog member $8^a$ is disposed as stated, the other member, 8, extends between the ratchet-teeth $b'$ and the bottom of the recess $e$, and near the corner formed by the junction of the outer sides of the dog a pivot $e'$ is inserted through alined perforations in the side walls of the recess $e$ and the body of the dog. The member 8 of the latch-dog is formed with a toe on its free end to engage the ratchet-teeth $b'$.

Upon the cross-bar $7^a$ one end of a plate-spring 9 is secured by screws $g$ or other means, the free end of the spring extending toward and above the open end of the recess $e$, and to adapt the spring for proper contact with the edges of the back of the shank or lever 5 the free end of the spring may be slightly curved, so as to present a convex surface to said edges. In the bottom wall of the recess $e$ at a suitable distance from the pivot $e'$ a threaded perforation is formed, wherein the threaded body of a set-bolt 10 is screwed, said bolt having a roughened head $10^a$ to enable the bolt to be adjusted manually.

A conical perforation $h$ is formed in the member $8^a$ of the latch-dog opposite the threaded perforation that receives the set-bolt 10, and the free end of the set-bolt is reduced in thickness, so as to produce a stem $h'$ thereon, which is loosely inserted through the conical perforation $h$. The stem $h'$ is loosely secured in the dog member $8^a$ by means of a washer $i$, that is mounted upon and secured to the end of the stem that extends inward through said dog member.

Assuming that the latch-dog members 8 8ᵃ are relatively disposed as represented in Figs. 2 and 3, it will be obvious that the slidable jaw 7 may be moved toward the fixed jaw 6 by pressure applied to the jaw 7, so that a nut or bolt-head may be engaged by said jaws if the object to be gripped is placed between said jaws.

When it is desired to firmly grip a nut or other angular object having two opposite sides, the loose jaw 7 should be moved up so as to contact with one side of the nut or bolt-head, while the fixed jaw is in contact with the opposite side of the nut. The set-bolt 10 is now screwed into the wall of the jaw 7, so as to rock the member 8 outwardly, which will cause the free end of said dog member that is bedded in a space between two ratchet-teeth $b'$ to press upon the engaged straight wall of the tooth and push the jaw 7 so as to cause it to bear forcibly upon a nut or the like and insure a tight grip of the wrench-jaws upon the article between them.

To release the grip of the wrench-jaws from an object, it is only necessary to screw the set-bolt 10 outward, which will release the jaws sufficiently to permit the wrench to be removed from the object it has gripped, there being roughened places $m$ formed on opposite sides of the loose jaw 7 to afford means for gripping the jaw and pulling it away from the spring 9, which will remove the dog member 8 from engagement with the ratchet-teeth $b'$, so that the jaw may be slidably moved to any desired point on the lever 5, the abutment-flange $c$ preventing the complete removal of the jaw.

Having thus described my invention, I claim as new and desire to secure by Letters Patent—

1. A wrench comprising a handle-lever, a fixed jaw at one end of said lever, the jaw having a face at a right angle to a side of the lever, ratchet-teeth in series formed on said side of the lever and hooking toward the fixed jaw, an abutment-flange at the end of the series of teeth farthest from the fixed jaw, a recessed jaw having a cross-bar at one end and loosely mounted upon the handle-lever, an L-shaped latch-dog pivoted at its corner in the recess of the jaw and adapted to engage a toe on the end of one member thereof between adjacent ratchet-teeth, a plate-spring secured by one end and upon the cross-bar and pressing at its free end on the back of the shank or lever over the toe of the dog, a set-bolt screwing into the bottom wall of the recess in the loose jaw, and means for loosely securing the inner end of the set-bolt in a perforation formed in the other member of the latch-dog.

2. A wrench comprising a handle-lever, a fixed jaw at one end of the lever, ratchet-teeth formed in the side of the handle-lever, opposite the gripping-face of the fixed jaw, said teeth hooking toward the fixed jaw, a recessed jaw having a cross-bar at one end of the recess, an L-shaped latch-dog pivoted at its corner in the recess, one member of the dog having a toe adapted to engage between two adjacent ratchet-teeth, a plate-spring secured by one end upon the cross-bar and pressing its free end upon the back of the shank or lever above the toe of the latch-dog, a set-bolt screwing through the bottom wall of the recess and having a stem on its inner end, said stem having a loose engagement in an opposite perforation in the remaining member of the latch-dog, and means for loosely securing the stem within said perforation.

In testimony whereof I have signed my name to this specification in the presence of two subscribing witnesses.

HERMAN STEIN.

Witnesses:
 C. J. STEIN,
 HIO ZANK.